(12) United States Patent
Li

(10) Patent No.: US 7,764,597 B2
(45) Date of Patent: Jul. 27, 2010

(54) METHOD FOR IMPLEMENTING NETWORK PROTECTION COMBINING NETWORK ELEMENT DUAL HOMING AND RING NETWORK PROTECTION

(75) Inventor: Xixiang Li, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 382 days.

(21) Appl. No.: 11/890,557

(22) Filed: Aug. 6, 2007

(65) Prior Publication Data

US 2007/0274207 A1 Nov. 29, 2007

Related U.S. Application Data

(63) Continuation of application No. PCT/CN2006/000568, filed on Mar. 31, 2006.

(30) Foreign Application Priority Data

Apr. 4, 2005 (CN) .................... 2005 1 0063129

(51) Int. Cl.
*H04J 1/16* (2006.01)
(52) U.S. Cl. .................... 370/216; 370/400; 398/1
(58) Field of Classification Search ......... 370/216–228, 370/400–405; 398/1–8, 59
See application file for complete search history.

(56) References Cited

U.S. PATENT DOCUMENTS

| 5,398,329 | A | * | 3/1995 | Hirata et al. ............... 714/11 |
| 5,517,498 | A | * | 5/1996 | Hauris et al. ............. 370/431 |
| 6,643,464 | B1 | | 11/2003 | Roorda |
| 6,990,320 | B2 | * | 1/2006 | LeCren ................. 455/67.11 |
| 7,130,263 | B1 | * | 10/2006 | Ong et al. .................. 370/223 |
| 7,342,873 | B1 | * | 3/2008 | Nagarajan ................. 370/217 |
| 2002/0097673 | A1 | * | 7/2002 | Suzuki ..................... 370/222 |
| 2003/0005165 | A1 | * | 1/2003 | Langridge et al. ........... 709/251 |
| 2003/0031124 | A1 | * | 2/2003 | Chow et al. ................ 370/216 |
| 2004/0146058 | A1 | * | 7/2004 | Nemoto et al. ............. 370/401 |
| 2004/0223503 | A1 | | 11/2004 | Lynch |
| 2006/0045519 | A1 | * | 3/2006 | Oren ........................... 398/4 |

FOREIGN PATENT DOCUMENTS

| CN | 1459160 | 11/2003 |
| CN | 1459160 A | 11/2003 |
| CN | 1567889 | 1/2005 |
| CN | 1567889 A | 1/2005 |
| WO | 03/005623 A2 | 1/2003 |
| WO | WO03005623 A2 | 1/2003 |

* cited by examiner

*Primary Examiner*—Ricky Ngo
*Assistant Examiner*—Gary Mui
(74) *Attorney, Agent, or Firm*—Ladas & Parry, LLP

(57) ABSTRACT

A method for protecting a network comprising a first network element, which homes to a second network element and a third network element on the same ring network, the method comprising the steps of: establishing and transporting on the second network element a service from the first network element to the second network element, and detecting the status of the service; sending a switching message to the third network element upon detection of a failure of the service between the first network element and the second network element; and establishing and transporting a service as failed from the first network element to the second network element by the third network element, by using network resource of the ring network assigned on the second network element for the failed service prior to the failure of the service, in response to the switching message.

8 Claims, 3 Drawing Sheets

METHOD FOR IMPLEMENTING NETWORK PROTECTION COMBINING NETWORK ELEMENT DUAL HOMING AND RING NETWORK PROTECTION

CROSS-REFERENCE TO RELATED APPLICATIONS

The present application is a continuation application of PCT application No. PCT/CN2006/000568, filed Mar. 31, 2006, which claims Chinese priority No. 200510063129.8, filed Apr. 4, 2005.

FIELD OF THE INVENTION

The present invention relates to protection technologies for communication networks, and particularly to a method for protecting a network through a combination of network element dual homing and ring network protection.

BACKGROUND OF THE INVENTION

With the rapid development of the communication industry, optical transport networks are also undergoing profound revolutions. The vigorous emergence of data services makes the data transport technologies widely applied such as MPLS (Multi-Protocol Label Switching), and at a network level, there have been protection methods of data transport networks and network element dual homing.

The networking of data transport networks often adopts the method of network element dual homing. As shown in FIG. 1, a path for transporting service is established respectively between a network element P and network elements A and B. Service is transported through the service path (working path) between the network element P and the network element A. If the network element A fails, the service can be transported through the path between the network element P and the network element B. Normally, only the path between the network element P and the network element A is used to transport service, and the path between the network element P and the network element B can be considered as a protection path.

The dual-homing networking can protect a service in operation from being influenced due to the failure of either of the network elements A, B. For example, when service is transported from the network element P to the network element A and the termination point is a network element E, and if the network element A fails, the network element P transports the service through the protection path to the network element B, and the network element B transports the service through a ring network to a network element D and then to a network element E. If the network element D fails, the network element B transports the service through the ring network to a network element C and then to the network element E.

For the dual-homing networking, it is unnecessary for an aggregation network element (the network element A or B) to conduct a 1+1 hot backup. Moreover, a protection switching of a service can be enabled when an intermediate network node or a working path fails. Thus, the investment of the operator can be saved effectively.

An MSP (Multiplexing Section Protection) is generally applied for the ring network protection. For the dual-homing protection, it is necessary to configure on an uplink network element (the network element A or B) a path for forwarding or transporting service. In other words, a bandwidth is reserved for the service of the network element P respectively on the uplink network elements A and B. The ring network protection will reserve a further protection bandwidth for the services of the network elements A and B. Thus, the transport of the service from the network element P occupies a bandwidth four times its own. As shown in FIG. 2, only a quarter of the total bandwidth operates for the service, and the rest has to be reserved as a protection bandwidth for the service protection.

Generally, it is sufficient for the ring network protection to additionally reserve a protection bandwidth identical to the width of the working path. However in the prior art, the coordination of the network element dual homing and the ring network protection results in a use of only a quarter of bandwidth of the whole ring network, and hence there is a waste of the ring network bandwidth. If the network elements A and B simply dual-home to a more convergence ring network, the bandwidth occupied by the service of the network element P will be as large as 16 times in the higher-layer ring network.

Furthermore, since there is no relevant fast switching mechanism provided in the prior art for the dual-homing networking, a protection path is typically obtained through rerouting when a working service fails. However, this approach is time-consuming and needs a time period hardly less than 50 ms, and hence cannot support a time delay sensitive service, such as a voice or video service.

SUMMARY OF THE INVENTION

The invention provides a method for protecting a network including a first network element through a combination of network element dual homing and ring network protection, so as to eliminate the waste of network resources with the combination of network element dual homing and ring network protection in the prior art.

In view of the above, an embodiment of the present invention provides the following solution.

A method for protecting a network includes a first network element, which homes to a second network element and a third network element on the same ring network, the method including the steps of:

establishing and transporting on the second network element a service from the first network element to the second network element, and detecting the status of the service; and sending a switching message to the third network element upon detection of a failure of the service between the first network element and the second network element; establishing and transporting a service as failed from the first network element to the second network element by the third network element, by using network resource of the ring network assigned on the second network element for the failed service prior to the failure of the service, in response to the switching message.

The above method further includes: notifying the first network element, by the second network element, of service configuration information of the second network element through a configuration synchronization message upon establishment of the service from the first network element to the second network element; and notifying the third network element of the service configuration information through the configuration synchronization message by the first network element; the service configuration information comprising the network resource of the ring network which is assigned to the failed service. Alternatively, the service configuration information may be sent to the third network element through a network administrator.

In the above method, if network resource is reserved for service protection when the second network element establishes the service from the first network element to the second network element, then:

the third network element uses the reserved network resource to transport the service, with the network resource originally used by the second network element to transport the failed service as network resource for service protection; or the third network element uses the network resource originally used by the second network element to transport the failed service to transport the service, with the reserved network resource as network resource for service protection.

The above method further includes: checking correctness and integrity as well as whether a path available for the failed service can be established at the third network element, by the third network element; and upon a failure of the check, reporting an alarm and prohibiting the failed service from being switched to the third network element.

The above method further includes: ceasing transporting the failed service from the first network element to the second network element, upon detection of the failure of the service between the first network element and the second network element.

The ring network is a Multiplexing Section Protection ring network, a channel ring network, a Resilient Packet Ring network or a Resilient MPLS Ring network.

In MSP, a protection mode for the ring network is a 1+1 or 1:1 protection mode.

Compared with the prior art, the method according to the present invention uses, after the switching, working and protection bandwidths of a ring network used by the network element prior to the switching, and thus the dual homing of a network element to the ring network results in no extra protection bandwidth assigned in the ring network and a large number of ring network resources can be saved. Even when a network element in the ring network homes to a more convergence ring network, no replication of the protection bandwidth will occur. Furthermore, a network element used for protection can obtain service configuration information on a working network element, and thus can enable a rapid switching of a filed service upon receipt of a switching message.

DETAILED DESCRIPTION OF THE INVENTION

In view of such an issue that many network resources, such as the bandwidth, are occupied when the network element dual homing and the ring network protection are combined in the prior art, among two network elements for the dual homing protection, a service is normally established only on a working network element, and network resources are assigned and reserved on the working network element, according to embodiments of the present invention. No network resource is assigned and reserved on a protection network element. Only during a switching for protection, the network resources can be assigned and reserved on the protection network element so as to protect a service and a network node and to have an efficient use of bandwidth.

Figure 1:
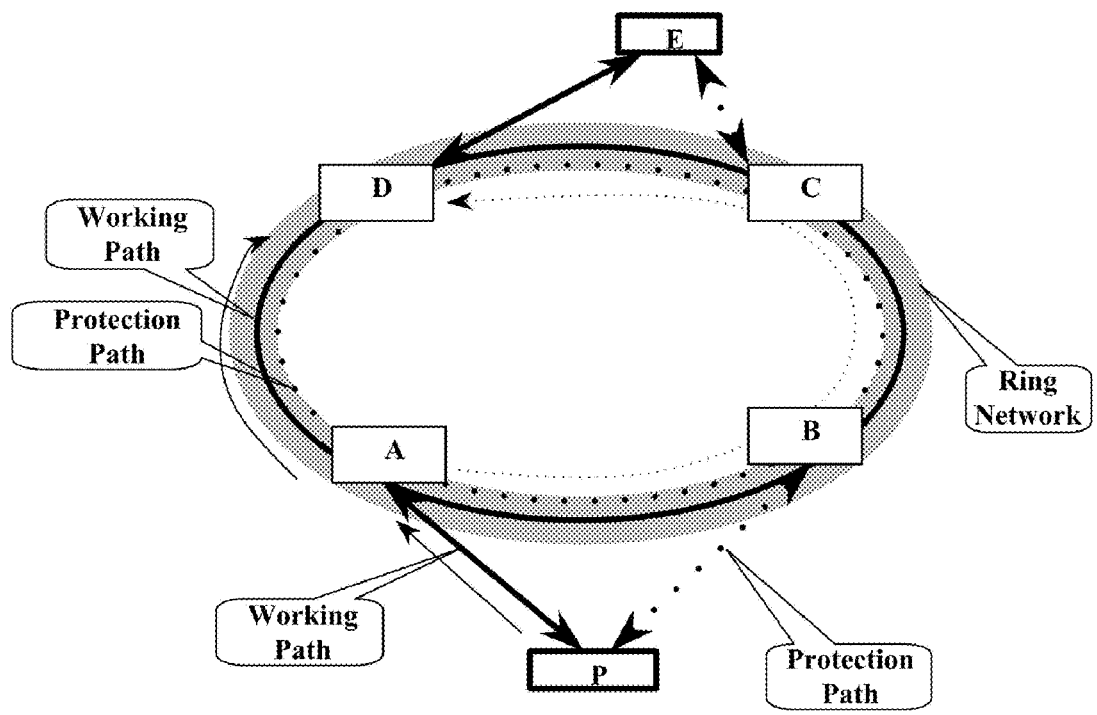
FIG. 1 is a schematic diagram of network element dual homing in the prior art.
Figure 2:
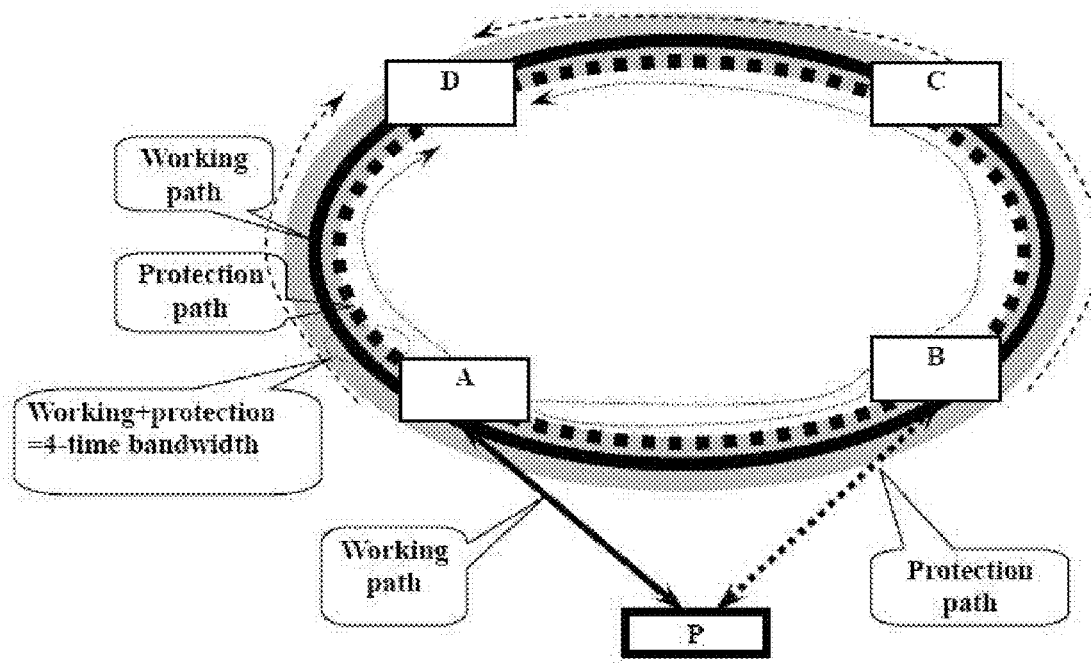
FIG. 2 is a schematic diagram of four-time bandwidth occupied in a ring network in the prior art.
Figure 3:
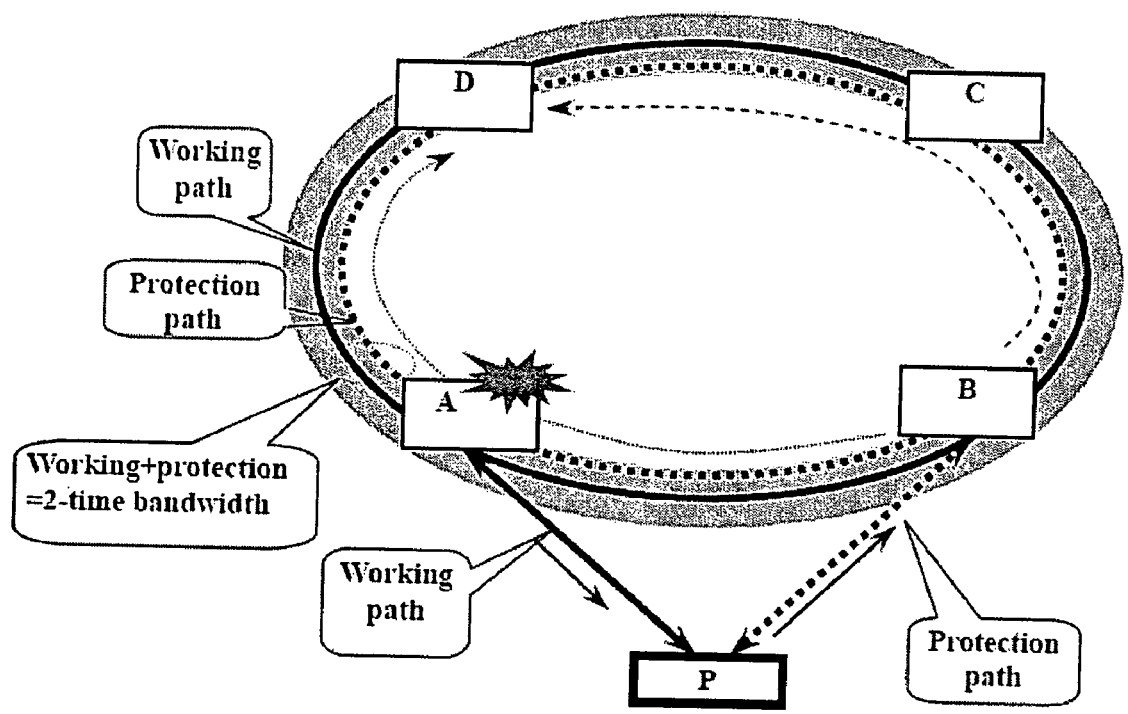
FIG. 3 is a schematic diagram of two-time bandwidth occupied in a ring network according to an embodiment of the present invention.

With reference to FIG. 3, a network element P dual-homes to a network element A and a network element B both of which are located in the same ring network. A switching protocol operates respectively between the network element P and the network elements A and B. Normally (both network elements A and B work normally), a service of the network element P is only established on the network element A. When a protection bandwidth of a ring network service is configured in the ring network, a protection bandwidth is reserved in the ring network for a service from the network element A to the network element P. In this case, no service of the network element P is established on the network element B, and no bandwidth is reserved on the network element B for any service of the network element P.

Upon detection of a full failure (or a partial failure) of the service from the network element P to the network element A, i.e. the network element A fails or a fiber connection from the network element P to the network element A fails, the switching protocol in operation notifies the network element P, a specific procedure of which is described as following.

A protocol for maintaining a path connection status, such as the OAM protocol, operates between the network elements A and P. If the network element A fails, the network element P cannot receive any message of the path connection status, then the network element P sends a switching message to the network element B informing the network element B to establish a service path for the network element P. Next, the service originally transported from the network element P to the network element A is switched into the service path from the network element P to the network element B for transport. If the fiber connection from the network element P to the network element A fails, the service path from the network element P to the network element A becomes failed. In the case of a failure in the direction from the network element P to the network element A, the network element A cannot receive any message of the path connection status, and then the network element A sends to the network element P a switching message in the direction from the network element A to the network element P. The network element P starts a switching and sends a switching message to the network element B informing the network element B to establish a service path for the network element P. Next, the service originally transported from the network element P to the network element A is switched into the service path from the network element P to the network element B for transport. In the case of a failure in the direction from the network element A to the network element P, the switch process is similar to that in the case where the network element A fails. The above unidirectional switching can be performed only for the service in the failure direction or for both directions at the same time, such as the P-to-A direction and the A-to-P direction.

After a service path is established and the network resources are assigned on the network element A, service configuration information can be sent to the network element B through a message, or by a network operating person through a network administrator. Thus, the configuration information of the network element A is stored on the network element B, but at this time, no protection path will be established and no network resource will be assigned. The network element B checks the service configuration information sent thereto so as to determine correctness and integrity of the information and whether it can be allowed to establish a service path at the network element B, i.e. whether there is an appropriate channel, bandwidth or other network resources that allow the configuration for a service under protection. If the check fails, the service will be prohibited from being switched to the network element B.

The network element B neither configures a path nor assigns a related resource of bandwidth for the switched service until receiving the switching message from the network element P. For the assignment of the path and the bandwidth, a working path and a bandwidth used previously by a service from the network element P to the network element A can be used, or a network protection path for a ring network protection can be used, i.e. the assignment is performed in the protection path of the ring network, instead of occupying a spare bandwidth of the network element B in the ring network. After the network element B feedbacks a READY message to the network element P, the network element P starts the transport of the service to the network element B, and ceases transporting the service to the network element A. Therefore, the ring network protection can be enabled, and no ring network bandwidth will be wasted.

In the case that the switching protocol in operation detects that only a part of the service from the network element P to the network element A fails, using the same checking way as described in the switching procedure, only the failed part of the service will be switched from the network element A to the network element B, and the normal part of the service will not be switched. Alike, only the failed part of the service between the network elements P and A will be established and transported on the network element B, and only the transport of the failed part of the service from the network element P to the network element A will be terminated.

Prior to the switching, in order to enable the network element B to use a work bandwidth and a protection bandwidth reserved originally on the network element A for the service (i.e., the failed service) of the network element P, the network element P initiates a protocol to monitor the status of the network element A after the network element A establishes the service of the network element P, and the network elements A and B initiate a the configuration synchronization message for synchronization of the configuration information. The network element A informs, through the configuration synchronization message, the network element P of its own service configuration information, such as information on a ring network channel, a bandwidth or the like used by the network element A. The network element P informs, through the configuration synchronization message, the network element B of the service configuration information of the network element A. The network element B checks and temporarily stores the service configuration information of the network element A. If the check fails, an alarm can be reported to a network administration system informing a user to intervene. In this case, the system prohibits the service from being switched to the network element B, and the service remains in the path between the network elements P and A. If the check succeeds, the network element B can use the original working path of the network element A in the ring network, since that path is still integral in the ring network, and the protection path of the network element A in the ring network can also be used. In this case, the working-direction path of the network element B uses the protection-direction path of the network element A, and the protection-direction path of the network element B uses the working-direction path of the network element A. Thus, a bandwidth only twice that of the service of the network element P will be occupied in the ring network. Alike, the working-direction path of the network element B can also uses the working-direction path of the network element A, and the protection-direction path of the network element B uses the protection-direction path of network element A. Thus, a bandwidth only twice that of the service of the network element P will be occupied in the ring network.

According to an embodiment of the present invention, the ring network can be an MSP ring, a channel ring, an RPR (Resilient Packet Ring) or an RMR (Resilient MPLS Ring), etc. During the dual-homing switching, a method for configuring network resources on network element B can be dependent upon a method for protecting the ring network. For example, the MSP ring uses a protection time slot, the channel ring uses a protection channel, the RPR uses a flow in the protection direction and uses a bandwidth dependent upon a service level, and the RMR uses a protection LSP.

With a 1+1 protection method for the MSP, a reserved time slot can be used on the network element B during the dual-homing switch, and with a 1:1 protection method, an extra service beyond the reserved time slot can be dropped during the dual-homing switch.

As can be seen from the above, the embodiments of the invention are advantageous at least in the following aspects.

1. A bandwidth is assigned only to the network element A with a service in operation, and no bandwidth is assigned to the network element B that has no service in operation and is in a protection condition.

2. The service configuration information of the network element A is stored on the network element B in a protection condition, and the establishing of configuration and the assignment of network resources are triggered through the switching message.

3. After the dual-homing protection starts, the service of the network element P is switched from the network element A to the network element B. The service of the network element is established on the network element B, which in turn receives the service from the network element P. Thus, the dual-homing protection can be enabled.

4. The network element B uses the work band protection bandwidths originally used by the network element A to establish the service.

5. Because a service is established and a ring network bandwidth is assigned for the network element B only during the dual-homing switching, the dual homing of the network element to the ring network will result in no extra protection bandwidth assigned in the ring network.

6. Because neither protection service is established nor protection bandwidth is assigned for the network element B operating normally, the dual homing of the network elements A and B to the more convergence ring network will result in no replication of the protection bandwidth.

While the preferred embodiments of the present invention have been described as above, the scope of the present invention shall not be limited thereto, and those skilled in the art can make various changes and modifications to the embodiments without departing from the scope of the present invention. It is intended all the variations and modifications shall fall within the scope of the present invention that shall be merely as defined in the claims thereof.

What is claimed is:

1. A method for protecting a network through a combination of network element dual homing and ring network protection, the network comprising a first network element, which homes to a second network element and a third network element on the same ring network, wherein the first network element is not on the ring network, the method comprising the steps of:

establishing and transporting on the second network element a service from the first network element to the second network element, and detecting the status of the service;

sending a switching message to the third network element upon detection of a failure of the service between the first network element and the second network element; and establishing and transporting a service as failed from the first network element to the second network element by the third network element, by using network resource of the ring network assigned on the second network element for the failed service prior to the failure of the service, in response to the switching message.

2. The method according to claim 1, further comprising:

notifying the first network element, by the second network element, of service configuration information of the second network element through a configuration synchronization message upon establishment of the service from the first network element to the second network element; and notifying the third network element of the service configuration information through the configuration synchronization message by the first network element;

the service configuration information comprising the network resource of the ring network which is assigned to the failed service.

3. The method according to claim 2, further comprising:

checking correctness and integrity as well as whether a path available for the failed service can be established at the third network element, by the third network element; and upon a failure of the check, reporting an alarm and prohibiting the failed service from being switched to the third network element.

4. The method according to claim 1, further comprising: sending service configuration information to the third network element by the second network element through a network administrator upon establishment of the service from the first network element to the second network element, the service configuration information comprising the network resource of the ring network which is assigned to the failed service.

5. The method according to claim 1, wherein if network resource is reserved for service protection when the second network element establishes the service from the first network element to the second network element, then:

the third network element uses the reserved network resource to transport the service, with the network resource originally used by the second network element to transport the failed service as network resource for service protection; or the third network element uses the network resource originally used by the second network element to transport the failed service to transport the service, with the reserved network resource as network resource for service protection.

6. The method according to claim 1, further comprising: ceasing transporting the failed service from the first network element to the second network element, upon detection of the failure of the service between the first network element and the second network element.

7. The method according to claim 1, wherein the ring network is a Multiplexing Section Protection ring network, a channel ring network, a Resilient Packet Ring network or a Resilient MPLS Ring network.

8. The method according to claim 7, wherein in MSP, a protection mode for the ring network is a 1+1 or 1:1 protection mode.

* * * * *